(12) United States Patent
McKinley et al.

(10) Patent No.: US 7,566,022 B1
(45) Date of Patent: Jul. 28, 2009

(54) FLY TYING APPARATUS

(76) Inventors: Brad L. McKinley, 640 Arapahoe Trail, Lake George, CO (US) 80827; Bruce N. Haugh, 684 Crystal Peek Dr., Florissant, CO (US) 80816

( * ) Notice: Subject to any disclaimer, the term of this patent is extended or adjusted under 35 U.S.C. 154(b) by 294 days.

(21) Appl. No.: 11/567,408

(22) Filed: Dec. 6, 2006

(51) Int. Cl.
*B21C 47/02* (2006.01)
(52) U.S. Cl. .................. 242/446; 242/443; 43/57.2; 43/42.53; 269/216; 269/221; 269/256
(58) Field of Classification Search .................. 242/446, 242/445, 443, 448; 43/1, 4, 57.1, 57.2, 42.53; 269/907, 221, 242, 216, 219, 240, 243, 256
See application file for complete search history.

(56) References Cited

U.S. PATENT DOCUMENTS

| | | | |
|---|---|---|---|
| 2,486,142 A | 9/1949 | Fong | |
| 2,586,636 A | 2/1952 | Fischer et al. | |
| 3,060,613 A | 9/1962 | Murray | |
| 4,169,562 A | 10/1979 | Renzetti | |
| 4,184,645 A | 1/1980 | Starling | |
| 4,544,145 A * | 10/1985 | Norlander | 269/69 |
| 4,969,636 A | 11/1990 | Gautam | |
| 5,169,079 A | 12/1992 | Renzetti | |
| 5,716,020 A | 2/1998 | Shults | |
| 5,762,327 A * | 6/1998 | Loustau et al. | 269/71 |
| 5,809,686 A | 9/1998 | Abby | |
| 6,119,972 A | 9/2000 | Vogel et al. | |
| 6,401,442 B1 | 6/2002 | Root et al. | |
| 6,526,690 B2 | 3/2003 | Dillard | |
| 6,564,494 B2 | 5/2003 | Renzetti | |
| 7,232,119 B2 * | 6/2007 | Yonenoi | 269/71 |

* cited by examiner

Primary Examiner—Emmanuel M Marcelo

(57) ABSTRACT

A fly tying apparatus includes a base abutting a support surface and a stanchion attached to and extending upwardly from the base. A rotational assembly is rotatably mounted on the stanchion. A fly gripping assembly is mounted to the rotational assembly. The fly gripping assembly includes a jaw mount attached to the rotational assembly. The jaw mount includes a mounting collar. A jaw assembly is mounted to the jaw mount. The jaw assembly engages a bend of a fish hook. The jaw assembly is slidably mounted in the mounting collar. The jaw assembly comprises a pair of jaws, a first adjustment assembly configured to selectively angle the jaws with respect to each other, and a second adjustment assembly configured to selectively alter a distance between the jaws.

18 Claims, 10 Drawing Sheets

FLY TYING APPARATUS

BACKGROUND OF THE INVENTION

1. Field of the Invention

The present invention relates to fly tying devices and more particularly pertains to a new fly tying device for holding and rotating a fishhook while materials are tied or fastened to a shank of the fishhook to make artificial flies and the like.

2. Description of the Prior Art

The use of fly tying devices is known in the prior art. While these devices fulfill their respective, particular objectives and requirements, the need remains for a device that includes improved methods of both gripping and positioning of a fishhook so that it may be rotated about an axis of its shank. In particular the device should first include a gripping means for gripping the fishhook which allows for variances in the thicknesses and shapes of hooks. Additionally, the device may include adjustment means for repositioning the gripping means with respect to other adjacent portions of the device. This will assist a user of the device in the positioning of the hook into proper rotational alignment. Finally, the device may include staging means for ensuring that the hook is correctly positioned and aligned with a rotational axis of the device to improve the efficiency of the utilization of the device. The staging means can be used during the positioning of the of gripping means or during the gripping of the hook by the gripping means.

SUMMARY OF THE INVENTION

The present invention meets the needs presented above by generally comprising a base abutting a support surface and a stanchion attached to and extending upwardly from the base. A rotational assembly is rotatably mounted on the stanchion. A fly gripping assembly is mounted to the rotational assembly. The fly gripping assembly includes a jaw mount attached to the rotational assembly. The jaw mount includes a mounting collar. A jaw assembly is mounted to the jaw mount. The jaw assembly engages a bend of a fish hook. The jaw assembly is slidably mounted in the mounting collar to allow the jaw assembly to be positioned at a selected extension away from the second arm. The jaw assembly comprises a pair of jaws, a first adjustment assembly configured to selectively angle the jaws with respect to each other, and a second adjustment assembly configured to selectively alter a distance between the jaws.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
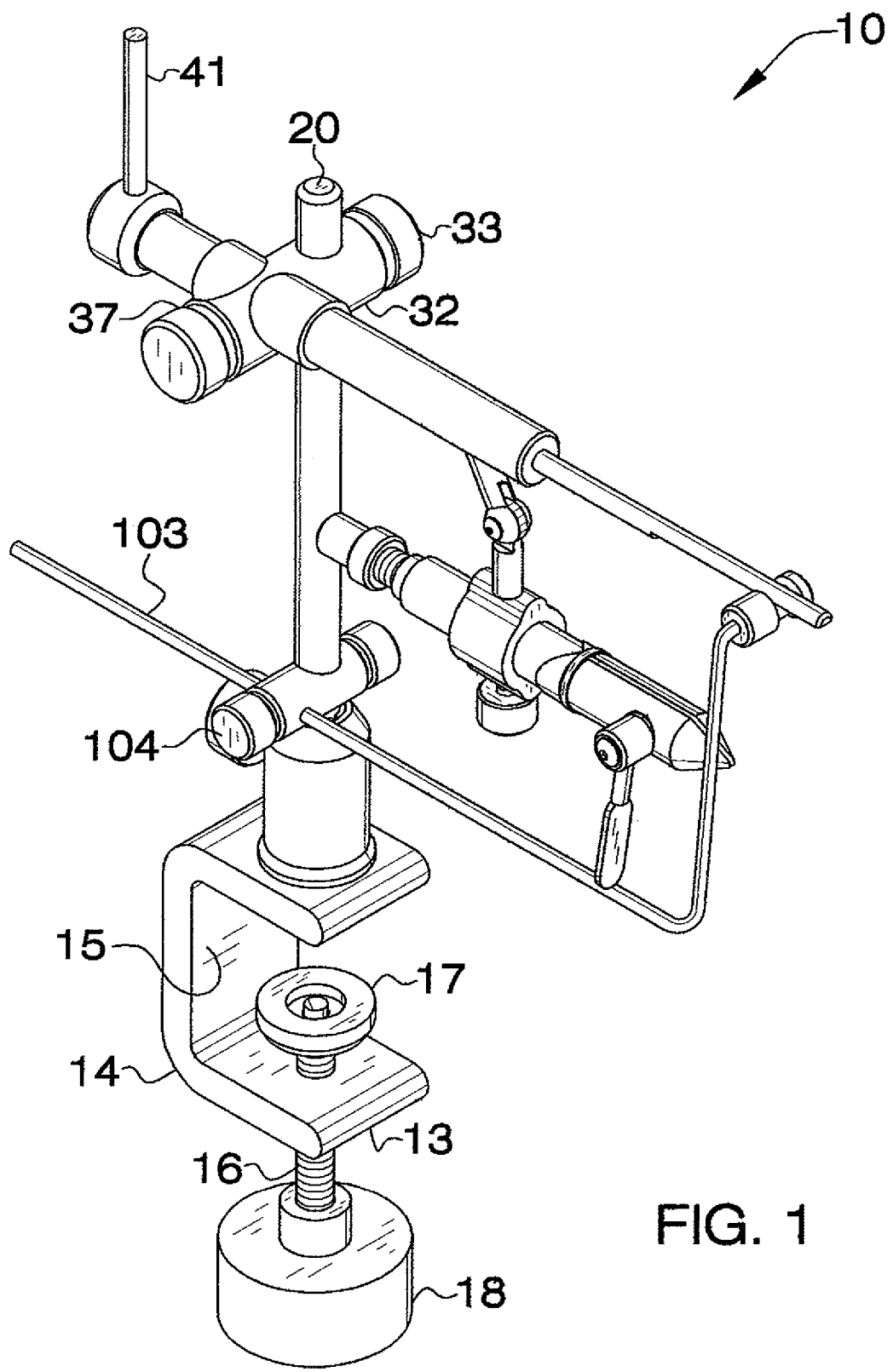
FIG. 1 is a perspective view of a fly tying apparatus according to the present invention.
Figure 2:
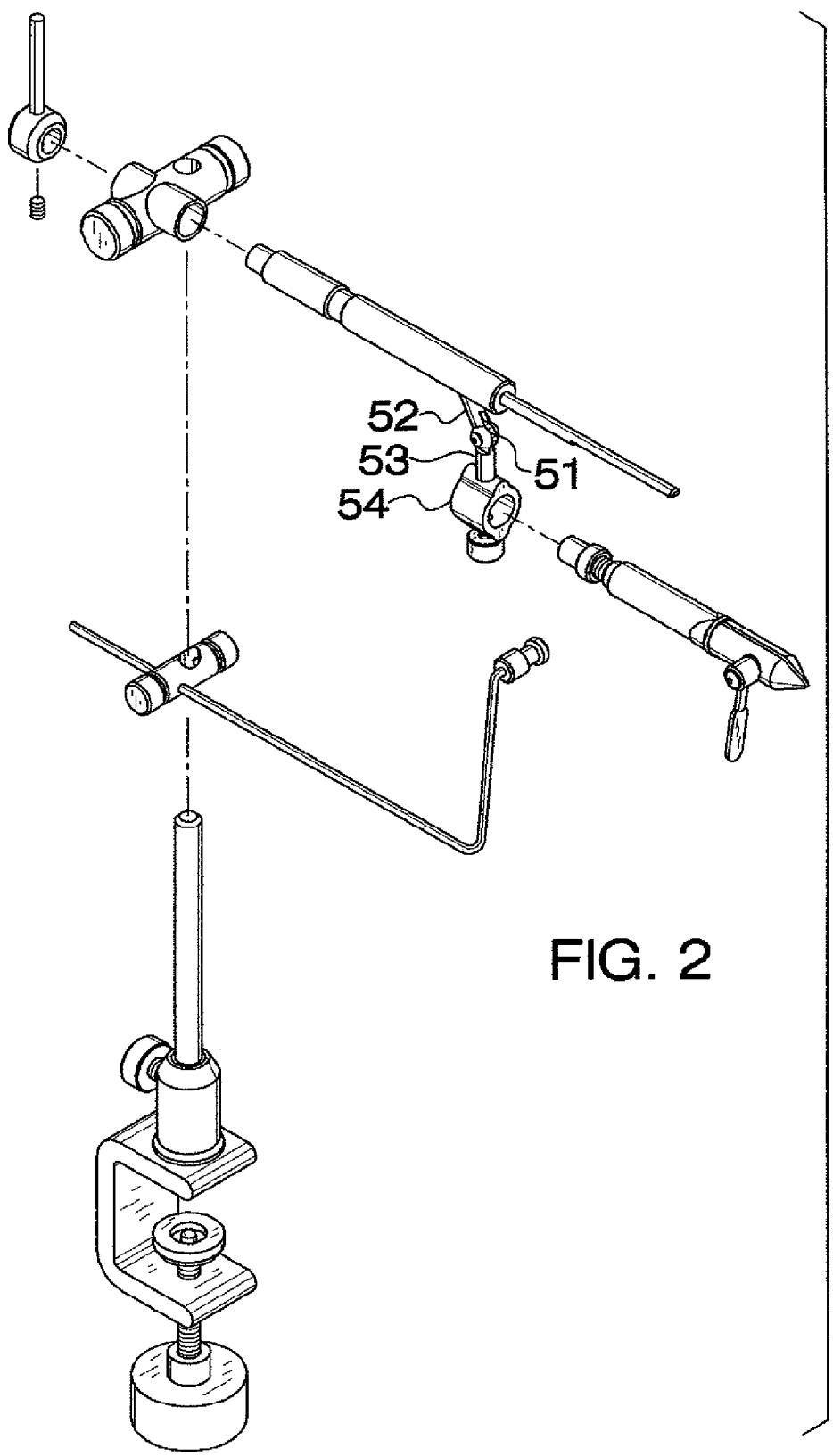
FIG. 2 is a perspective expanded view of the present invention.
Figure 3:
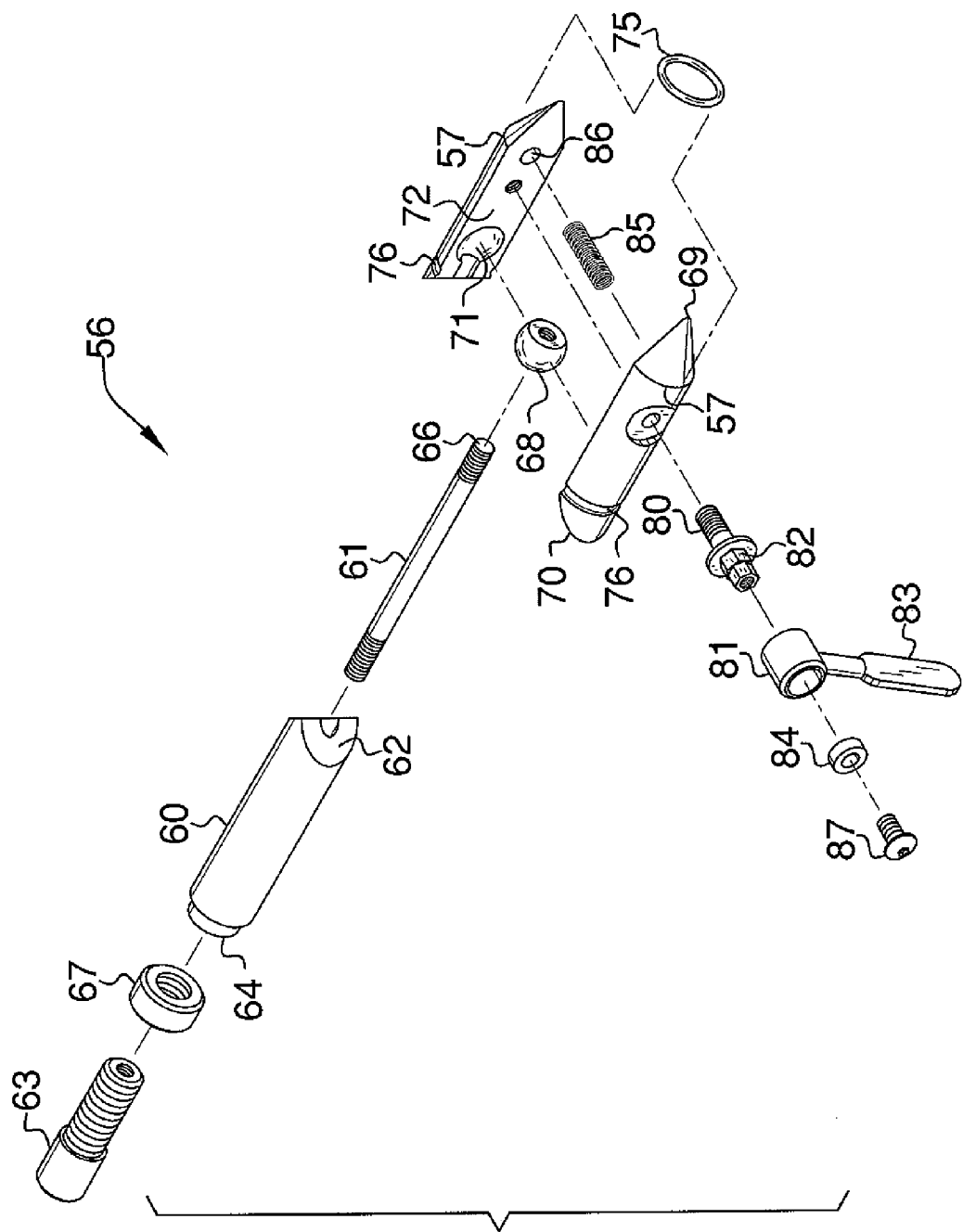
FIG. 3 is a perspective expanded view of a hook gripping assembly of the present invention.
Figure 4:
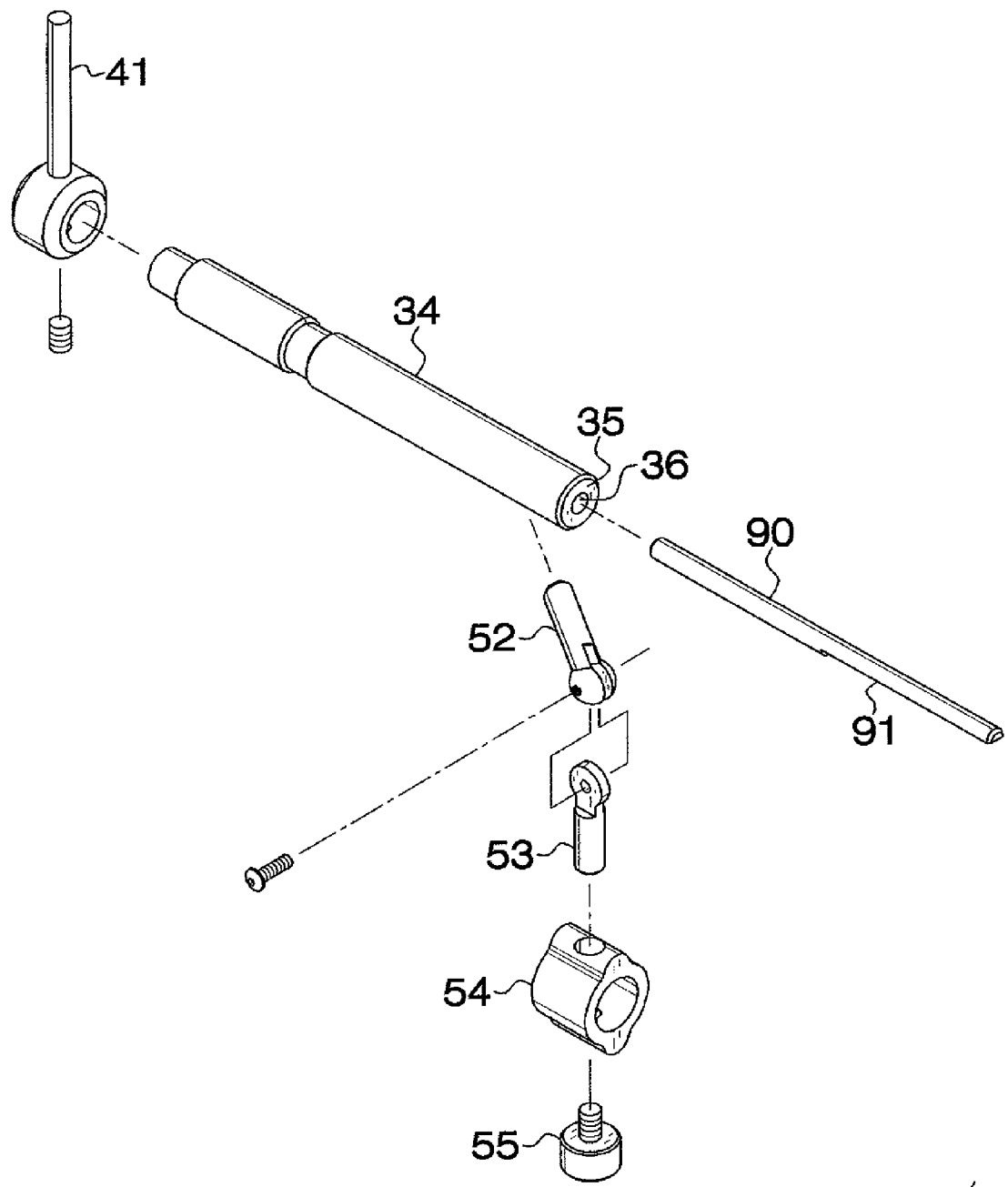
FIG. 4 is a perspective expanded view of a rotational assembly of the present invention.

With reference now to the drawings, and in particular to FIGS. 1 through 12 thereof, a new fly tying device embodying the principles and concepts of the present invention and generally designated by the reference numeral 10 will be described.

As best illustrated in FIGS. 1 through 12, the fly tying apparatus 10 generally comprises a base 12 that abuts a support surface, not shown, such as a table or bench. The base 12 comprises a generally conventional clamp 13 configured to be releasably attached to the support surface. The clamp 13 includes a saddle 14 forming a channel 15 to receive an edge of the support surface. A threaded rod 16 is threadably coupled the saddle 14 and extends into the channel 15. A foot plate 17 is coupled to an end of the threaded rod 16 and is positioned in the channel 15. The foot plate 17 is abutted against the support surface and biases the support surface against a portion of the saddle 14. A clamping knob 18 is coupled to an end of the threaded rod 16 positioned outside of the channel 15. Alternatively, the base 12 may consist of a weighted platform that is positioned on top of the support surface.

Figure 5:
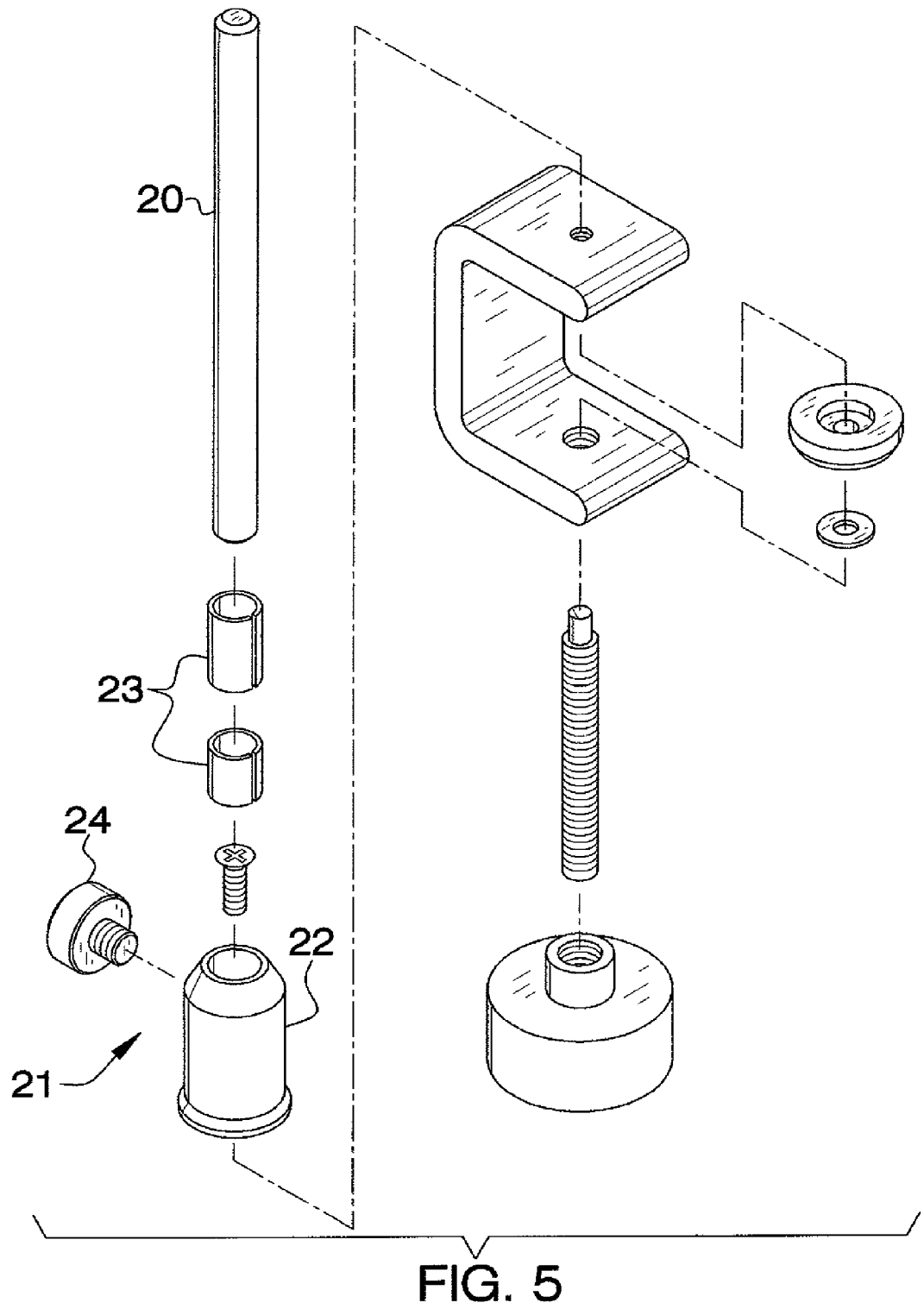
FIG. 5 is an expanded perspective view of a base of the present invention.
Figure 6:
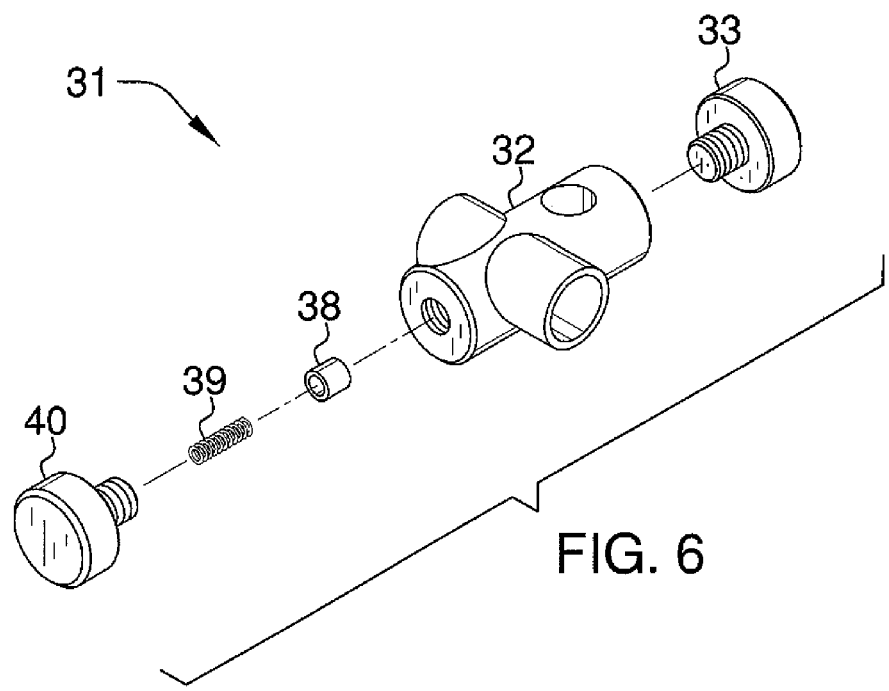
FIG. 6 is an expanded perspective view of a spin resistance brake of the present invention.
Figure 7:
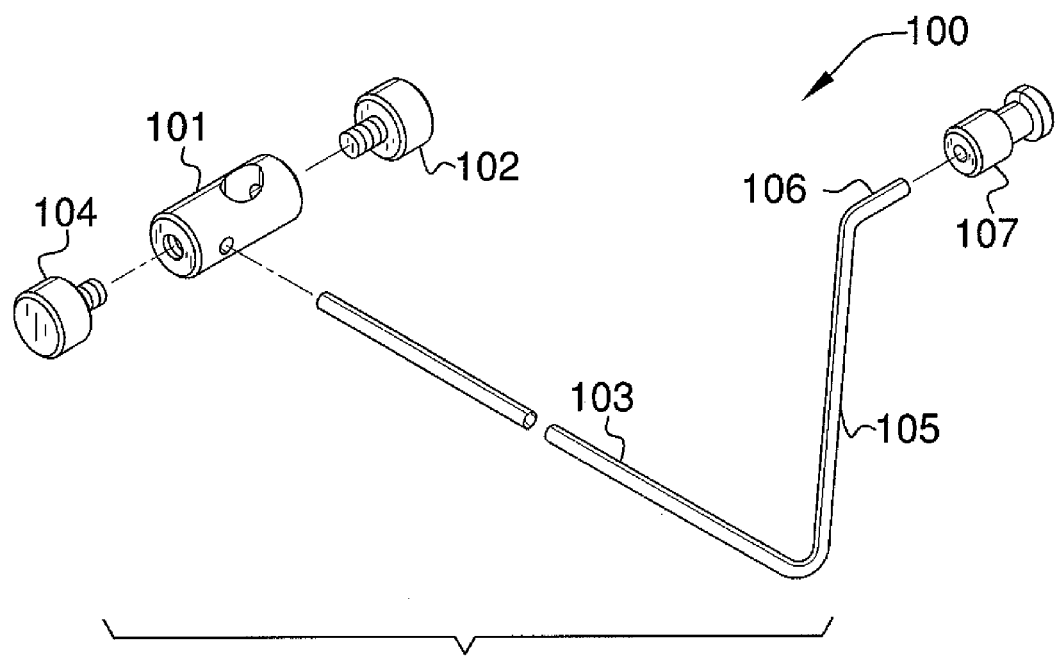
FIG. 7 is a perspective expanded view of a bobbin assembly of the present invention.
Figure 8:
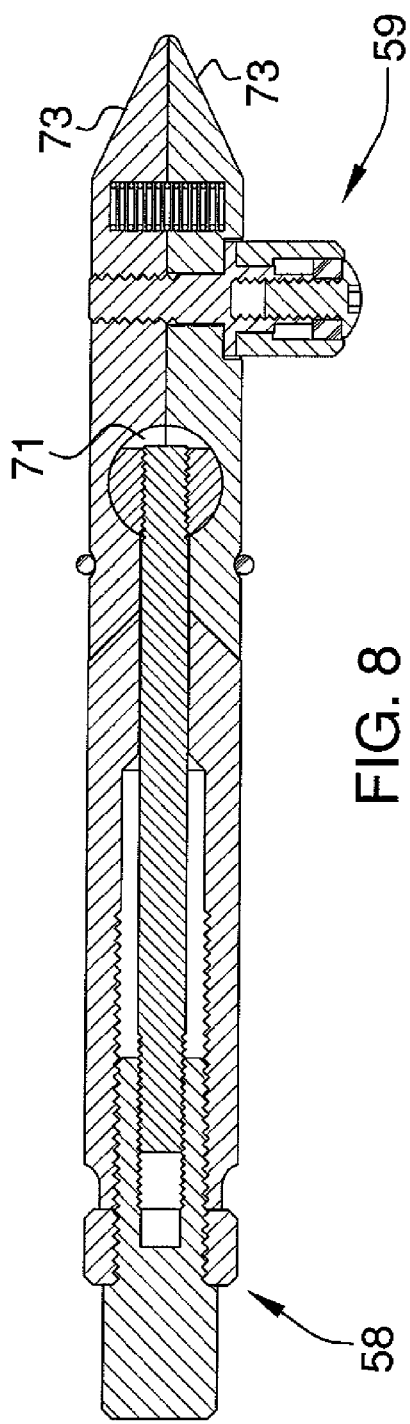
FIG. 8 is a cross-sectional view of a jaw assembly of the present invention.
Figure 9:
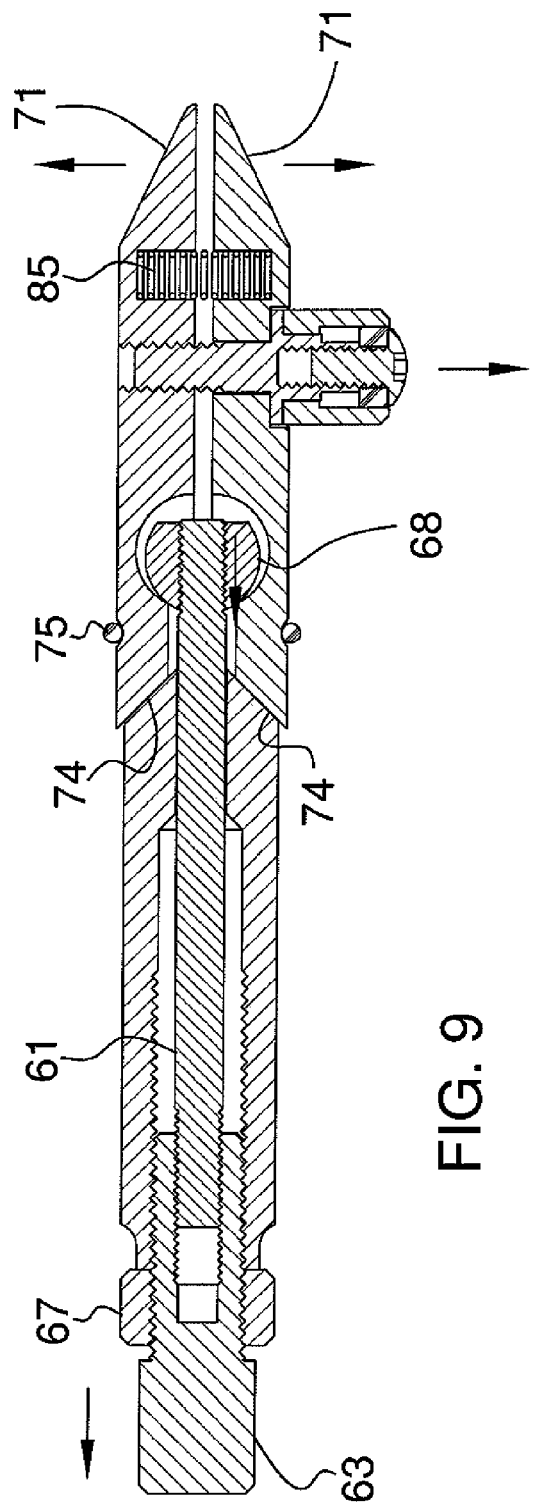
FIG. 9 is a cross-sectional view of the jaw assembly of the present invention.
Figure 10:
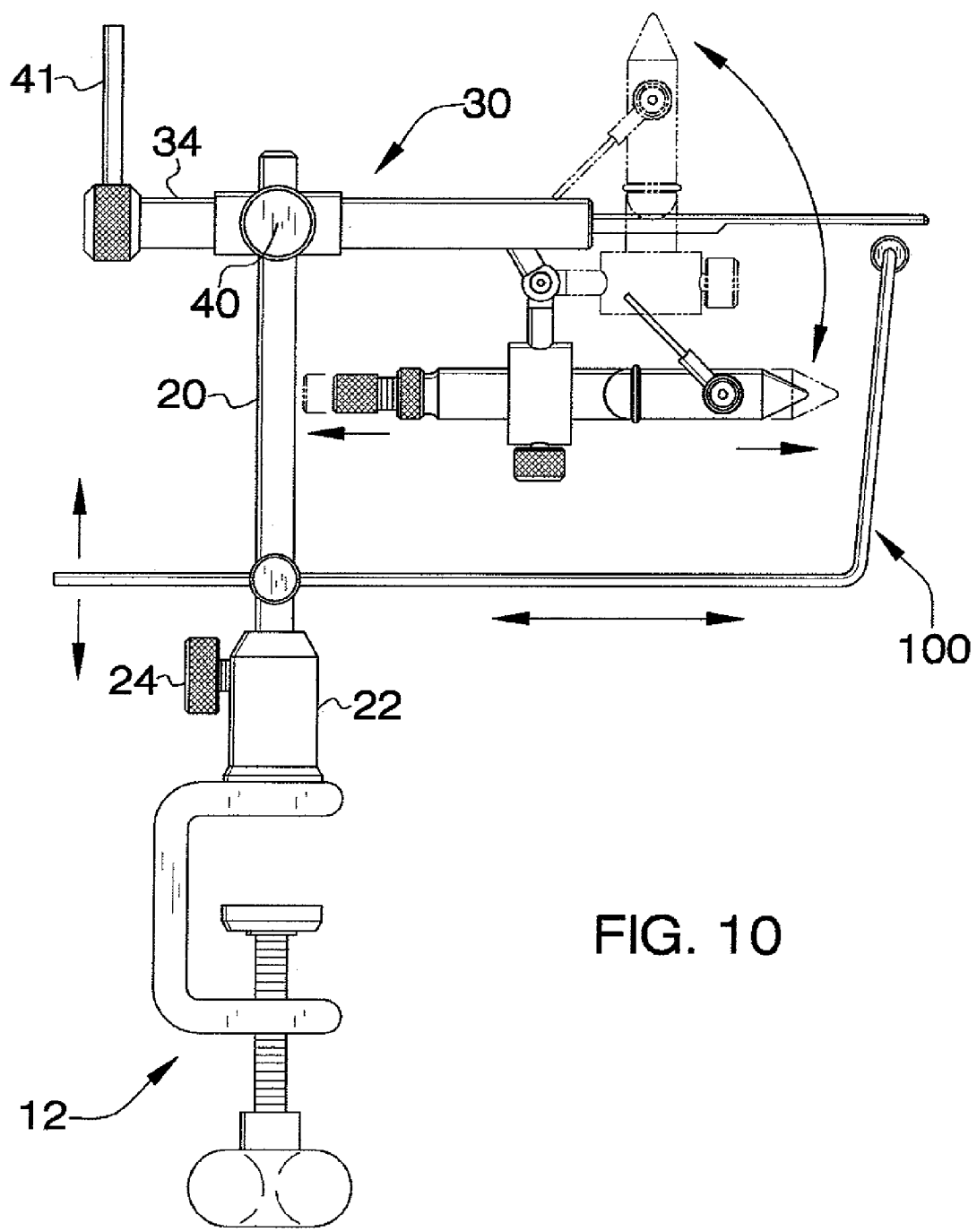
FIG. 10 is a side view of the present invention.
Figure 11:
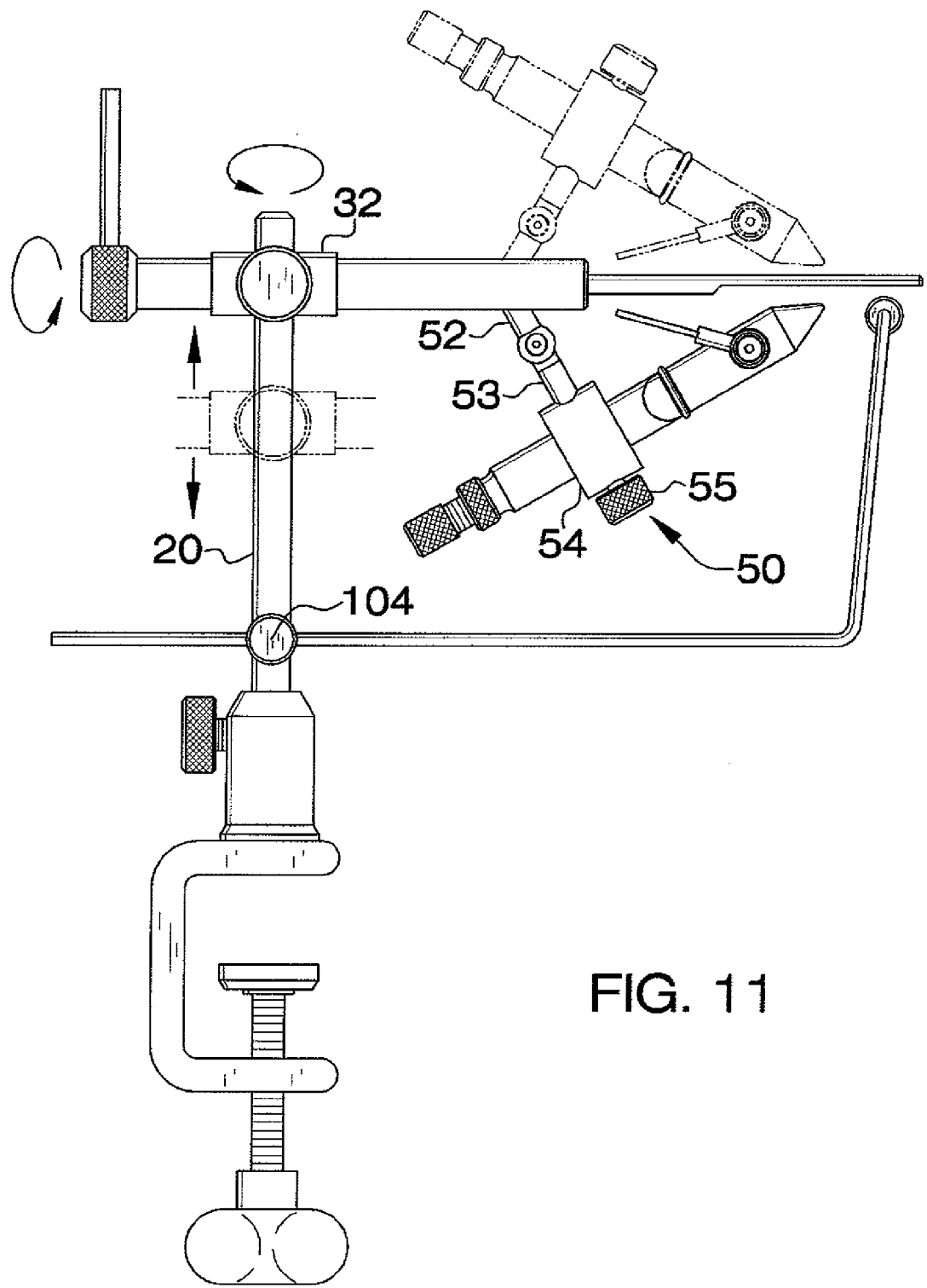
FIG. 11 is a side view of the present invention.

A stanchion 20 attached to the base 12 extends upwardly therefrom. The stanchion 20 is rotatable with respect to the base 12. A breaking unit 21 is attached to the base 12 and is configured to selectively lock rotation of the stanchion 20 with respect to the base 12. The stanchion 20 is inserted into and extends upwardly from the braking unit 21. The braking unit 21 is adjustable to change the amount of force necessary to rotate the stanchion 20 around a longitudinal axis of the stanchion 20. The braking unit 21 includes a pedestal 22 that is coupled to the base 12 and extends upwardly from the base 12. At least one braking bushing 23 is inserted into the pedestal 22. The stanchion 20 is inserted into at least one braking bushing 23. Increased pressure on the at least one braking bushing 23 increases frictional contact between the stanchion 20 and the at least one braking bushing 23. FIG. 5 shows two braking bushings 23 being utilized. A brake knob 24 is threadably coupled to and extends into the pedestal 22. The brake knob 24 abuts against the at least one braking bushing 23. Rotation of the brake knob 24 changes an amount of pressure the brake knob 24 applies to the at least one braking bushing 23.

A rotational assembly 30 is mounted on the stanchion 20. The rotationally assembly 30 includes a securing unit 31 that is mounted to the stanchion 20 of the base. The securing unit 31 includes a housing 32 slidably receiving the stanchion 20, wherein the stanchion 20 is rotatable with respect to the housing 32. A position of the housing 32 along the stanchion 20 is adjustable. A vertical adjustment knob 33 is threadably coupled to the housing 32 and is abuttable against stanchion 20. The vertical adjustment knob 33 is rotated with respect to the housing 32 to change a frictional engagement of the stanchion 20 with respect to the housing 32. A spin shaft 34 is rotatably mounted to the securing unit 31. The spin shaft 34 is angled with respect to the stanchion 20. The spin shaft 34 has a front end 35 positioned distal to the securing unit 31. An angle between the stanchion 20 and the spin shaft 34 is between approximately 80 degrees and 100 degrees, and more particularly is approximately perpendicular to the stanchion 20. The spin shaft 34 extends through the housing 32. The spin shaft 34 is rotational about a longitudinal axis of the spin shaft 34. The front end 35 has an aperture 36 extending therein.

A spin resist brake 37 is mounted on the housing 32 and is configured to selectively increase friction between the housing 32 and the spin shaft 34. The spin resist brake 37 includes a braking plug 38 that is slidably positioned in the housing 32 and is abutted against the spin shaft 34. A plug biasing member 39 abuts the braking plug 38. A compression knob 40 is threadably coupled to the housing 32 and abuts the breaking plug 38. The compression knob 40 selectively urges the plug biasing member 39 toward the braking plug 38 to alter friction between the breaking plug 38 and the spin shaft 34. A rotation lever 41 is coupled to and extends approximately orthogonal to the spin shaft 34 to assist a user in rotating the spin shaft 34. The rotation lever 41 is positioned adjacent to the housing 32 so that the housing 32 is positioned between the rotation lever 41 and the front end 35 of the spin shaft 34.

A fly gripping assembly 50 is mounted to the rotational assembly 30. The fly gripping assembly 50 includes a jaw mount 51 that is attached to the rotational assembly 30. The jaw mount 51 includes a first arm 52 that is coupled to the spin shaft 34. The first arm 52 extends from the spin shaft 34 at an angle between approximately 45 degrees and 70 degrees with respect to the spin shaft 34. A second arm 53 is pivotally coupled to the first arm 52. The second arm 53 pivots in a plane extending through the longitudinal axis of the spin shaft 34. A mounting collar 54 is coupled to the second arm 53 distal the first arm 52. A collar knob 55 is used for tightening or loosing an item placed into and with respect to the collar 54.

The fly gripping assembly 50 includes a jaw assembly 56 that is mounted to the jaw mount 51. The jaw assembly 56 engages a bend of a fish hook 8. The jaw assembly 56 is slidably mounted in the mounting collar 54 to allow the jaw assembly 56 to be positioned at a selected extension away from the second arm 53. The jaw assembly 56 comprises a pair of jaws 57, a first adjustment assembly 58 configured to selectively angle the jaws 57 with respect to each other and a second adjustment assembly 59 configured to selectively alter a distance between the jaws 57.

The first adjustment assembly 58 includes a sleeve 60 that is received by the mounting collar 54. The sleeve 58 is slidably mounted in the mounting collar 54. A draw rod 61 is positioned in the sleeve 60 and extends outwardly of a first end 62 of the sleeve 60. An adjustment knob 63 extends into a second end 64 of the sleeve 60 and is threadably coupled to the sleeve 60. The adjustment knob 63 threadably receives the draw rod 61. The adjustment knob 63 is rotated with respect to the sleeve 60 to adjust a distance between a free end 66 of the draw rod 61 and the sleeve 60. A locking collar 67 is threadably coupled to the adjustment knob 63. The locking collar 67 abuts the second end 64 of the sleeve 60 to inhibit inadvertent rotation of the adjustment knob 63 with respect to the sleeve 60. A protuberance 68 is attached to the free end 66 of the draw rod 61. The protuberance 68 is approximately spherical shaped.

Each of the jaws 57 of the pair of jaws has a distal end 69 and a proximal end 70 with respect to the sleeve 60. Each of the jaws 57 has a socket depression 71 therein extending into a mating face 72 of the associated one of the jaws 57 and positioned adjacent the proximal ends 70. The socket depression 71 of each of the jaws 57 receives the protuberance 68 when the mating faces 72 of the jaws 57 face each other. Nose portions 73 of the jaws 57 are positioned adjacent to the distal ends 69. The nose portions 73 are clamped on opposing sides of the bend of the fish hook 8 to secure the fish hook 8 between the mating faces 72. Each of the mating faces 72 adjacent to the proximal end 70 is angled outwardly from an associated one of the mating faces 72 to form a wedge receiving cavity 74. The first end 62 of the sleeve 60 is wedge shaped and is positioned in the wedge receiving cavity 74. A distance between the mating faces 72 adjacent the socket depressions 71 is adjusted when the protuberance 68 is pulled against or moved away from first end 62 of the sleeve 60. This in turn adjusts an angle between mating faces 72 of the nose portions 73. A compression ring 75 is positioned in a groove 76 in an exterior face of each of the jaws 57. The compression ring 75 biases the jaws 57 against the protuberance 68 positioned in the socket depressions 71.

The second adjustment assembly 59 extends into each of the jaws 57 between the nose portions 73 and the socket depressions 71. The adjustment assembly 59 is actuated to adjust a distance between the mating faces 72. The adjustment assembly 59 includes a stud 80 extending through one of the jaws 57 and is threadably coupled to the other one of the jaws 57. The stud 80 is rotated to change the distance between the mating faces 72. A socket 81 engages a plurality of indexing faces 82 of the stud 80 to facilitate rotation of the stud 80. A handle 83 is coupled to the socket 81. A securing fastener 87 extends through the socket 81 and threadably engages the stud 80. The securing fastener 87 secures the socket 81 to the stud 80. A resistance washer 84 is positioned between the securing fastener 83 and the socket 81. The resistance washer 84 is comprised of a resiliently compressible material to permit the socket 81 to be selectively slid away from the stud 80. This allows the socket 81 to be rotated to position the handle 83 in desirable direction without rotating the stud 80. The resiliently compressible material forces the socket 81 back into engagement with the indexing faces 82 of the stud 80 when the socket 81 is released. A jaw biasing member 85 is positioned in a biasing hole 86 of each of the jaws 57. The biasing hole 86 extends into the mating face 72 and positioned adjacent the nose portion 73 of an associated one of the jaws 57. The jaw biasing member 85 biases the mating faces 72 apart when the adjustment assembly 59 is actuated to allow separation of the mating faces 72 to form an opening for receiving the hook 8.

Figure 12:
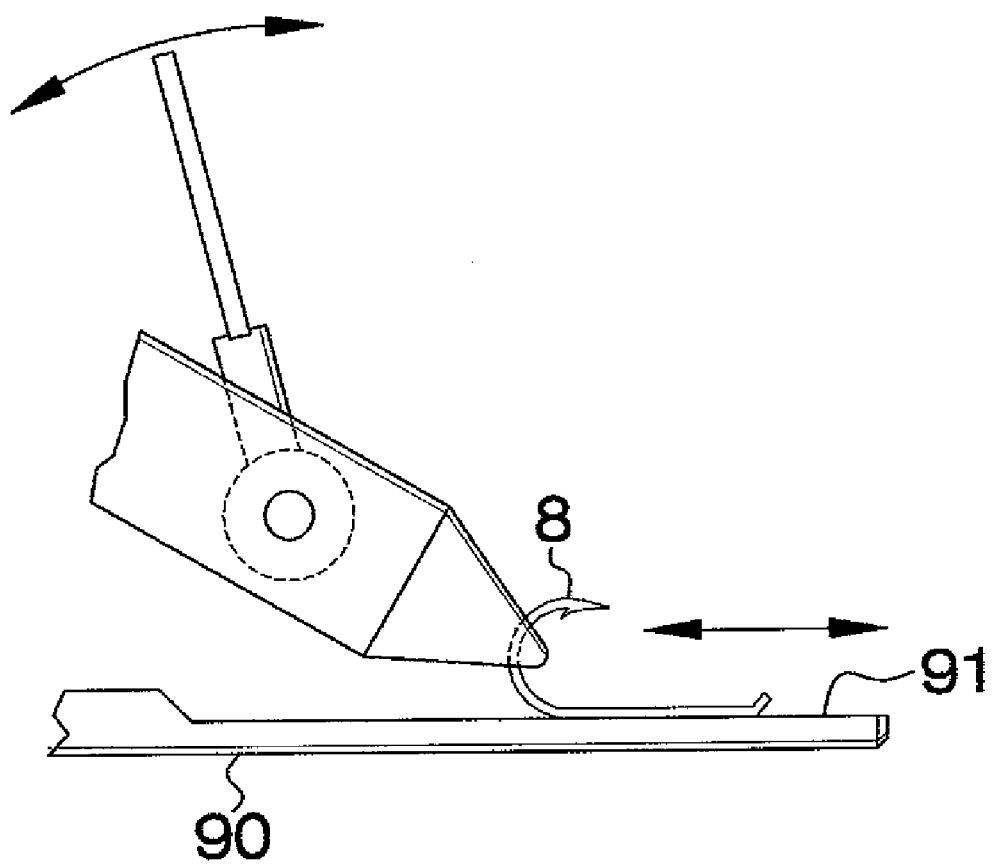
FIG. 12 is a side view of a stage of the present invention.

An alignment bar 90 is removably inserted into the aperture 36 in the spin shaft 34. The alignment bar 90 has a staging face 91 that is axially aligned with the alignment bar 90 and the rotational assembly 30. The staging face 91 is approximately planar to allow a shank of the fish hook 8 to be axially aligned with the rotational assembly 30 as shown in FIG. 12. The alignment bar 90 is removed from the rotational assembly 30 when thread is to be tied onto the fish hook 8. In use, the alignment bar 90 is inserted into the 36 aperture and the jaw assembly 56 is aligned with the staging face 91 of the alignment bar 90 to permit the shank of the fish hook 8 to abut the staging face 91 when the jaw assembly 56 engages the bend of the fish hook 8. This ensures that the hook 8, or more particularly the shank of the hook 8, is axially aligned with an axial rotational of the rotational assembly 30 for easier positioning and winding of thread on the hook 8.

A generally conventional bobbin assembly 100 is slidably mounted to the stanchion 20. The bobbin assembly 100 receives thread that is to be tied to the hook 8. The bobbin assembly 100 includes a securing shaft 101 slidably receiving the stanchion 20. The stanchion 20 extends through the securing shaft 101. A height of the securing shaft 101 on the stanchion 20 is adjustable. A height adjustment knob 102 threadably engages the securing shaft 101 and abuts the stanchion 20. The height adjustment knob 102 is rotated with respect to the securing shaft 101 to change frictional engagement of the stanchion 20 with the securing shaft 101. A horizontal arm 103 is slidably extended through the securing shaft 101. The horizontal arm 103 extends orthogonally to the stanchion 20. A securing knob 104 threadably engages the securing shaft 101 and extends into the securing shaft 101. The securing knob 104 is selectively abutted against the horizontal arm 103 to maintain a selected length of the horizontal arm 103 extending from the securing shaft 101. A vertical arm 105 is coupled to the horizontal arm 103 distal the securing shaft 101. The vertical arm 105 is angled between 70 degrees and 110 degrees with respect to the horizontal arm 103 and extends upwardly therefrom. A horizontal extension 106 is coupled to the vertical arm 105 distal the horizontal arm 103. The horizontal extension 106 is positioned orthogonally to the vertical arm 105 and perpendicular to the horizontal arm 103. A bobbin 107 is rotatably coupled to the horizontal extension 106. The bobbin 107 will have the thread, not shown, wound thereon.

In use, the jaw assembly 56 may be adjusted as need to accurately and precisely grip a hook 8. The hook 8 may be released, or retained in the jaw assembly 56, when the hook 8 is positioned on the alignment bar 90 while the second arm 53 of the jaw mount 51 is adjusted to position the hook 8 in alignment with the alignment bar 90. Once the hook 8 is properly aligned, the alignment bar 90 is removed from the rotational assembly 30. The rotational assembly 30 is then rotated, along with the hook 8, so that articles for facilitating fly fishing can be attached to the hook 8 with the thread.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fly tying apparatus for constructing a fly lure, said apparatus comprising:
    a base abutting a support surface;
    a stanchion being attached to said base and extending upwardly therefrom;
    a rotational assembly being rotatably mounted on said stanchion;
    a fly gripping assembly being mounted to said rotational assembly, said fly gripping assembly including;
        a jaw mount being attached to said rotational assembly, said jaw mount including a mounting collar;
        a jaw assembly being mounted to said jaw mount, said jaw assembly engaging a bend of a fish hook, said jaw assembly being slidably mounted in said mounting collar to allow said jaw assembly to be positioned at a selected extension away from said stanchion, said jaw assembly comprising:
            a pair of jaws;
            a first adjustment assembly configured to selectively angle said jaws with respect to each other;
            a second adjustment assembly configured to selectively alter a distance between said jaws; and
            said first adjustment assembly including a sleeve being received by said mounting collar, said sleeve being slidably mounted in said mounting collar, a draw rod being positioned in said sleeve and extending outwardly of a first end of said sleeve, an adjustment knob extending into a second end of said sleeve and being threadably coupled to said sleeve, said adjustment knob threadably receiving said draw rod, said adjustment knob being rotated with respect to said sleeve to adjust a distance between a free end of said draw rod and said sleeve, a protuberance being attached to said free end of said draw rod, said protuberance being positioned between and abutting each of said jaws, adjustment of said protuberance adjusting an angle between said jaws.

2. The apparatus according to claim 1, wherein each of said jaws of said pair of jaws has a distal end and a proximal end with respect to said sleeve, each of said jaws having a socket depression therein extending into a mating face of the associated one of said jaws and positioned adjacent said proximal ends, said socket depression of each of said jaws receiving said protuberance when said mating faces of said jaws face each other, nose portions of said jaws being positioned adjacent to said distal ends, said nose portions being clamped on opposing sides of the bend of the fish hook to secure the fish hook between said mating faces.

3. The apparatus according to claim 2, wherein each of said mating faces adjacent to said proximal end being angled outwardly from an associated one of said mating faces to form a wedge receiving cavity, said first end of said sleeve being wedge shaped and being positioned in said wedge receiving cavity, a distance between said mating faces adjacent said socket depressions being adjusted when a distance between said protuberance and said sleeve is adjusted to adjust an angle between said nose portions.

4. The apparatus according to claim 3, further including a compression ring being positioned in a groove in an exterior face of each of said jaws, said compression ring biasing said jaws against said protuberance positioned in said socket depressions.

5. The apparatus according to claim 3, wherein said second adjustment assembly extends into each of said jaws between said nose portions and said socket depressions, said adjustment assembly being actuated to adjust a distance between said mating faces, said adjustment assembly including a stud extending through one of said jaws and being threadably coupled to the other one of said jaws, said stud being rotated to change the distance between said mating faces.

6. The apparatus according to claim 5, further including a socket engaging a plurality of indexing faces of said stud to facilitate rotation of said stud, a handle being coupled to said socket.

7. The apparatus according to claim 6, further including a securing fastener extending through said socket and threadably engaging said stud, said securing fastener securing said socket to said stud, a resistance washer being positioned between said securing fastener and said socket, said resistance washer being comprised of a resiliently compressible material to permit said socket to be selectively slid away from said stud, wherein said socket can be rotated to position said handle in desirable direction without rotating said stud, said resiliently compressible material forcing said socket back into engagement with said indexing faces of said stud when said socket is released.

8. The apparatus according to claim 5, further including a jaw biasing member being positioned in a biasing hole of each of said jaws, said biasing hole extending into said mating face and positioned adjacent said nose portion of an associated one of said jaws, said jaw biasing member biasing said mating faces apart when said adjustment assembly is actuated to separate said mating faces.

9. The apparatus according to claim 5, wherein said jaw mount includes a first arm being coupled to a spin shaft of said rotational assembly, said first arm extending from said spin shaft at an angle between approximately 45 degrees and 70 degrees, a second arm being pivotally coupled to said first arm, said second arm pivoting in a plane extending through the longitudinal axis of said spin shaft, said mounting collar being coupled to said second arm distal said first arm.

10. The apparatus according to claim 3, further including a compression ring being positioned in a groove in an exterior face of each of said jaws, said compression ring biasing said jaws against said protuberance positioned in said socket depressions.

11. The apparatus according to claim 3, further including a locking collar being threadably coupled to said adjustment knob, said locking collar abutting said second end of said sleeve to inhibit inadvertent rotation of said adjustment knob with respect to said sleeve.

12. The apparatus according to claim 1, wherein said base comprises a clamp configured to be releasably attached to the support surface, said clamp including a saddle forming a channel to receive an edge of the support surface, a threaded rod being threadably coupled said saddle and extending into said channel, a foot plate being coupled to an end of said threaded rod and positioned in said channel, said foot plate being abutted against the support surface and biasing said support surface against a portion of said saddle, a clamping knob being coupled to an end of said threaded rod positioned outside of said channel.

13. The apparatus according to claim 1, wherein said stanchion is rotatable with respect to said base, a breaking unit being attached to said base and being configured to selectively lock rotation of said stanchion with respect to said base, said stanchion being inserted into and extending upwardly from said braking unit, said braking unit being adjustable to change the amount of force necessary to rotate said stanchion around a longitudinal axis of said stanchion.

14. The apparatus according to claim 13, wherein said braking unit includes:
a pedestal being coupled to said base and extending upwardly from said base;
at least one braking bushing being inserted into said pedestal, said stanchion being inserted into at least one braking bushing, increased pressure on said at least one braking bushing increasing frictional contact between said stanchion and said at least one braking bushing; and
a brake knob being threadably coupled to and extending into said pedestal, said brake knob abutting against said at least one braking bushing, rotation of said braking knob changing an amount of pressure said brake knob applies to said at least one braking bushing.

15. The apparatus according to claim 1, wherein said rotational assembly includes:
a securing unit being mounted to said stanchion of said base, said securing unit including, a housing slidably receiving said stanchion and being rotatable with respect to said housing, a position of said housing along said stanchion being adjustable, a vertical adjustment knob being threadably coupled to said housing and being abuttable against stanchion, said vertical adjustment knob being rotated with respect to said housing to change a frictional engagement of said stanchion with respect to said housing;
a spin shaft being rotatably mounted to said securing unit, said spin shaft being angled with respect to said stanchion, said spin shaft having a front end positioned distal to said securing unit, an angle between said stanchion and said spin shaft being between approximately 80 degrees and 100 degrees, said spin shaft extending through said housing, said spin shaft being rotational about a longitudinal axis of said spin shaft, said front end having an aperture extending therein;
a spin resist brake being mounted on said housing and being configured to selectively increase friction between said housing and said spin shaft, said spin resist brake including a braking plug being slidably positioned in said housing and being abutted against said spin shaft, a plug biasing member abutting said braking plug, a compression knob being threadably coupled to said housing and abutting said breaking plug, said compression knob selectively urging said plug biasing member toward said braking plug to alter friction between said breaking plug and said spin shaft; and
a rotation lever being coupled to and extending approximately orthogonal to said spin shaft, said rotation lever being positioned adjacent to said housing.

16. The apparatus according to claim 1, further including:
said rotational assembly including a securing unit being mounted to said stanchion, a spin shaft being rotatably mounted to said securing unit, said spin shaft having a front end positioned distal to said securing unit, said spin shaft being rotational about a longitudinal axis of said spin shaft, said front end having an aperture extending therein; and
an alignment bar being removably inserted into said aperture in said spin shaft, said alignment bar having a staging face being axially aligned with said alignment bar and said rotational assembly, said staging face being approximately planar to allow a shank of a fish hook to be axially aligned with said rotational assembly, said alignment bar being removed from said rotational assembly when thread is to be tied onto the fish hook, said alignment bar being inserted into an aperture extending into a front end of said spin shaft opposite said rear end of said spin shaft, said jaw assembly being aligned with said staging face of said alignment bar to permit the shank of the fish hook to abut said staging face when said jaw assembly engages the bend of the fish hook.

17. A fly tying apparatus for constructing a fly lure, said apparatus comprising:

a base abutting a support surface;
a stanchion being attached to said base and extending upwardly therefrom;
a rotational assembly being rotatably mounted on said stanchion,
a fly gripping assembly being mounted to said rotational assembly, said fly gripping assembly including,
 a jaw mount being attached to said rotational assembly, said jaw mount including a mounting collar;
 a jaw assembly being mounted to said jaw mount, said jaw assembly engaging a bend of a fish hook, said jaw assembly being slidably mounted in said mounting collar to allow said jaw assembly to be positioned at a selected extension away from said stanchion, said jaw assembly comprising;
 a pair of jaws;
 a first adjustment assembly configured to selectively angle said jaws with respect to each other; and
 a second adjustment assembly configured to selectively alter a distance between said jaws;
said stanchion beings rotatable with respect to said base, a breaking unit being attached to said base and being configured to selectively lock rotation of said stanchion with respect to said base, said stanchion being inserted into and extending upwardly from said braking unit, said braking unit being adjustable to change the amount of force necessary to rotate said stanchion around a longitudinal axis of said stanchion.

18. A fly tying apparatus for constructing a fly lure, said apparatus comprising:
a base abutting a support surface;
a stanchion being attached to said base and extending upwardly therefrom;
a rotational assembly being rotatably mounted on said stanchion;
a fly gripping assembly being mounted to said rotational assembly, said fly gripping assembly including;
 a jaw mount being attached to said rotational assembly, said jaw mount including a mounting collar;
 a jaw assembly being mounted to said jaw mount, said jaw assembly engaging a bend of a fish hook, said jaw assembly being slidably mounted in said mounting collar to allow said jaw assembly to be positioned at a selected extension away from said stanchion, said jaw assembly comprising;
 a pair of jaws;
 a first adjustment assembly configured to selectively angle said jaws with respect to each other,
 a second adjustment assembly configured to selectively alter a distance between said jaws;
a securing unit being mounted to said stanchion of said base, said securing unit including, a housing slidably receiving said stanchion and being rotatable with respect to said housing, a position of said housing along said stanchion being adjustable, a vertical adjustment knob being threadably coupled to said housing and being abuttable against stanchion, said vertical adjustment knob being rotated with respect to said housing to change a frictional engagement of said stanchion with respect to said housing;
a spin shaft being rotatably mounted to said securing unit, said spin shaft being angled with respect to said stanchion, said spin shaft having a front end positioned distal to said securing unit, an angle between said stanchion and said spin shaft being between approximately 80 degrees and 100 degrees, said spin shaft extending through said housing, said spin shaft being rotational about a longitudinal axis of said spin shaft, said front end having an aperture extending therein;
a spin resist brake being mounted on said housing and being configured to selectively increase friction between said housing and said spin shaft, said spin resist brake including a braking plug being slidably positioned in said housing and being abutted against said spin shaft, a plug biasing member abutting said braking plug, a compression knob being threadably coupled to said housing and abutting said breaking plug, said compression knob selectively urging said plug biasing member toward said braking plug to alter friction between said breaking plug and said spin shaft; and
a rotation lever being coupled to and extending approximately orthogonal to said spin shaft, said rotation lever being positioned adjacent to said housing.

\* \* \* \* \*